United States Patent
Stakhev et al.

(10) Patent No.: US 8,062,617 B2
(45) Date of Patent: Nov. 22, 2011

(54) PROCESS AND CATALYST SYSTEM FOR SCR OF $NO_x$

(75) Inventors: Alexandr Stakhev, Moscou (RU);
Søren Dahl, Hillerød (DK); Ioannis Gekas, Malmö (SE); Pär L. T. Gabrielsson, Helsingborg (SE)

(73) Assignee: Haldor Topsøe A/S, Lyngby (DK)

( * ) Notice: Subject to any disclaimer, the term of this patent is extended or adjusted under 35 U.S.C. 154(b) by 0 days.

(21) Appl. No.: 12/881,811

(22) Filed: Sep. 14, 2010

(65) Prior Publication Data
US 2011/0070134 A1    Mar. 24, 2011

(30) Foreign Application Priority Data
Sep. 24, 2009  (DK) ................................ 2009 01054

(51) Int. Cl.
*B01D 53/56*  (2006.01)
*B01D 53/94*  (2006.01)
*F01N 3/10*  (2006.01)

(52) U.S. Cl. ............... 423/213.2; 423/239.1; 423/239.2; 422/177; 422/180; 60/301

(58) Field of Classification Search ............... 423/213.2, 423/239.1, 239.2; 422/177, 180; 60/301
See application file for complete search history.

(56) References Cited

U.S. PATENT DOCUMENTS

| | | |
|---|---|---|
| 2004/0042947 A1 | 3/2004 | Hoard et al. |
| 2006/0286012 A1 | 12/2006 | Socha et al. |
| 2008/0038160 A1 | 2/2008 | Kil et al. |
| 2009/0075813 A1 | 3/2009 | Whisenhunt, Jr. et al. |
| 2011/0070134 A1* | 3/2011 | Stakhev et al. ............ 423/213.5 |

FOREIGN PATENT DOCUMENTS

| | | |
|---|---|---|
| EP | 1 495 804 A1 | 1/2005 |
| EP | 1 944 075 A2 | 7/2008 |

* cited by examiner

*Primary Examiner* — Timothy Vanoy
(74) *Attorney, Agent, or Firm* — Dickstein Shapiro LLP (57) ABSTRACT

Process for reducing nitrogen oxides to nitrogen in an exhaust gas comprising passing the exhaust gas in the presence of a reducing agent through a catalyst system comprising at least two catalyst beds, in which a first catalyst bed is an iron-beta-zeolite and a second catalyst bed downstream is silver supported on alumina.

14 Claims, 8 Drawing Sheets

PROCESS AND CATALYST SYSTEM FOR SCR OF $NO_x$

BACKGROUND OF THE INVENTION

1. Field of the Invention

The present invention concerns a process and catalyst system for reduction of nitrogen oxides from exhaust gases using a reducing agent such as ammonia and urea. In particular, the invention relates to a dual bed catalyst system for reduction of nitrogen oxides using a reducing agent in which the first catalyst bed is an iron-beta-zeolite (Fe-beta-zeolite) and the second catalyst bed downstream is silver supported on alumina ($Ag/Al_2O_3$). More particularly, the present invention relates to a process and catalyst system for converting NOx in exhaust gas from lean-burn combustion engines to nitrogen by adding a mixture of hydrogen and ammonia to the exhaust gas and subsequently passing the gas over a suitable dual bed catalyst, in which the first catalyst bed is an iron-beta-zeolite (Fe-beta-zeolite) and the second catalyst bed downstream is silver supported on alumina ($Ag/Al_2O_3$).

2. Description of the Related Art

The emission of nitrogen oxides by exhaust gases in stationary and automotive applications has long been a major environmental issue. The harmful effects of nitrogen oxides ($NO_x$) are well known, and therefore intensive research is being conducted to find processes and catalyst systems which are able to cope with stricter environmental regulations. Conventional catalysts for $NO_x$ reduction comprise vanadium; however, these catalysts are becoming less and less attractive as tightening environmental regulations are expected to forbid their use. In the automotive business, particularly in exhaust gases from lean-burn engines, the reduction of NOx to nitrogen ($N_2$) is usually conducted by using ammonia or urea as reducing agents over a suitable catalyst in the so-called selective catalytic reduction (SCR).

Systems utilising selective catalytic reduction (SCR) of $NO_x$ by ammonia (an aqueous solution of urea can also be used as ammonia source) to remove $NO_x$ from exhaust in lean burn combustion processes is well established both for stationary and automotive applications.

In some applications, especially automotive applications, when using commercial SCR catalysts like $V/W/TiO_2$ and Fe-zeolites, the standard SCR reaction ($4NO+4NH_3+O_2=4N_2+6H_2O$) is not fast enough at low temperatures (around 200° C.) to fulfil the $NO_x$ conversion requirements given by legislation in some countries. One way to obtain higher $NO_x$ conversion at these low temperatures is to take advantage of the so-called fast SCR reaction ($NO+NO_2+2NH_3=2N_2+3H_2O$). At normal conditions, the major part of the $NO_x$ in lean combustion exhaust is NO. Therefore, to obtain a $NO:NO_2$ ratio close to 1:1 required for the fast SCR reaction an oxidation catalyst for oxidation of NO to $NO_2$ is usually applied upstream the SCR catalyst. This solution has some drawbacks: 1) The oxidation catalyst required for the NO oxidation requires a high loading of precious Pt; 2) The oxidation catalyst deactivates significantly over time resulting in a change in SCR activity which makes regulation of the $NH_3$/urea dosage difficult; 3) It is not possible to obtain the optimum $NO:NO_2$ 1:1 ratio in the whole operational temperature interval.

High SCR activity can be achieved over Cu-zeolite materials without taking advantage of the fast SCR reaction; however, Cu-zeolites are more prone to hydrothermal deactivation than Fe-zeolites, which limits their use in many applications.

U.S. Pat. No. 6,689,709 discloses the use of iron-beta-zeolites for the selective reduction of nitrogen oxides with ammonia at high temperatures (425, 550° C.). By pre-steaming the catalysts at 600 to 800° C. for 0.25 to 8 h, the catalysts are shown to be hydrothermally stable.

Richter et al. (Catalysis Letters Vol. 94, Nos. 1-2, page 115, April 2004) shows that some catalysts based on $Ag/Al_2O_3$ function well as SCR catalyst when a mixture of $H_2$ and $NH_3$ is used as reducing agent. In a gas with a 1:10:1 molar ratio of $NH_3:H_2:NO$ and surplus of oxygen (6 vol % $O_2$), almost full NO conversion at a temperature as low as 200° C. is achieved. However, if hydrogen is removed from the gas the NO conversion becomes more limited at all temperatures in the range 150 to 450° C. In a gas with a 1:2.5:1 molar ratio of $NH_3:H_2:NO$, i.e. with reduced amount of hydrogen and surplus of oxygen (6 vol % $O_2$), over 90% NO conversion at 300° C. are achieved. NOx conversions close to 80% are obtained at 300° C. in a gas with 1:1.5:1 molar ratio of $NH_3:H_2:NO$. In other words, reduction of 1 mole of NO requires 1.5 to 2.5 or more moles of hydrogen. Using such a catalyst alone would require a significant amount of hydrogen to be used to obtain an acceptable $NO_x$ conversion over a broader range of temperatures, i.e. 150 to 550° C.

Our own studies on the performance of $Ag/Al_2O_3$ catalyst in $H_2$-assisted SCR removal with ammonia (or urea) show that this catalyst in the presence of reasonable amount of hydrogen (1000 ppm) provides a very promising $NO_x$ conversion in the course of $NH_3$-$DeNO_x$ of a gas with approximately 1:3:1 molar ratio of $NH_3:H_2:NO$ within the low temperature range 175 to 250° C. However, in the absence of hydrogen, which is desired in order to keep costs down, the catalyst is not active in SCR removal with ammonia or urea Our studies on this catalyst also show that the reduction of 1 mole of NO requires a considerable amount of hydrogen, namely 1.5 to 2 moles of hydrogen. Moreover, the catalyst deactivates after repetitive catalytic cycles due to the presence of $SO_2$ in the feed gas, particularly when exposed to high $SO_2$ content in the gas for short periods (e.g. 30 ppm for 2 h) compared to low $SO_2$ content in the gas for longer period (e.g. 8 ppm for 8 h).

It is therefore desirable to provide a process and a catalyst for NOx reduction which overcome the above problems.

SUMMARY OF THE INVENTION

Originally we intended to obtain a high NOx conversion at low temperature (about 200° C.) by simply mechanically mixing $Ag/Al_2O_3$ catalyst with Fe-beta-zeolite. This with the aim of being able to oxidize NO to $NO_2$ in the presence of ammonia to promote the fast SCR reaction as described above. However, the research experienced a twist: we found surprisingly that the combination of iron-beta-zeolite and silver supported on alumina in this respective order and in the form of a layered catalyst system and where the reducing agent comprises a mixture of ammonia and hydrogen, the hydrogen consumption is reduced compared to a situation where only silver supported on alumina is used. Good SCR catalytic activity is found in the broad temperature range 250 to 550° C. even in a gas with approximately 1:0.3:1 molar ratio of $NH_3:H_2:NO$, i.e. reduction of 1 mole of NO requires less than 1 mole of hydrogen. We have also found that the combination of iron-beta-zeolite and silver supported on alumina in this respective order and in the form of a layered catalyst system (dual bed catalyst system) results in a significantly higher resistance to deactivation. Hence, not only the activity of the catalyst is kept at desired levels over the whole temperature interval of 150 to 550° C., but also the hydrogen for obtaining NOx conversion over the whole temperature interval is only required at the lowest temperatures 150 to 200° C., the amount of hydrogen used being lower than when using silver on alumina catalyst alone.

As used herein the term "dual bed" means a catalyst system comprising at least two catalyst beds, viz. an upstream bed (first catalyst bed) and a subsequent downstream bed (second catalyst system). The term "dual bed" does not exclude the use of a third bed downstream the second catalyst bed.

Accordingly, in a first aspect of the invention we provide a process for reducing nitrogen oxides to nitrogen in an exhaust gas comprising passing the exhaust gas in the presence of a reducing agent through a catalyst system comprising at least two catalyst beds, in which a first catalyst bed is an iron-beta-zeolite and a second catalyst bed downstream is silver supported on alumina.

It is thus apparent that instead of simply mechanically mixing $Ag/Al_2O_3$ and the Fe-beta-zeolite, they are layered and thus physically separated. The performance of the catalyst system of the invention with separate layers of iron-beta-zeolite and $Ag/Al_2O_3$ downstream was found to be superior to the performance of mixed $Ag/Al_2O_3$ and iron-beta-zeolite. The layered catalyst demonstrates a stable performance and no tendency toward deactivation after repetitive catalytic cycles.

Preferably, the reducing agent is selected from ammonia, urea, hydrogen, alkanes such as $C_6H_{14}$, alkenes and mixtures thereof. More preferably, the reducing agent is a mixture of hydrogen and ammonia. Such reducing agents can also be used in combination with one or more of the below embodiments.

Preferably, in combination with one or more of the above below embodiments, the molar ratio of $NH_3:H_2:NO$ in the gas is 1:0.3-3:1 and the reaction temperature is in the range 150 to 550° C.

DETAILED DESCRIPTION OF THE PREFERRED EMBODIMENTS

In one embodiment of the invention, in combination with one or more of the above or below embodiments, the amount of silver in the second catalyst bed (silver loading) is 0.5 to 5 wt %; more preferably the amount of silver is 1 wt %.

The silver may be loaded by incipient-wetness impregnation. The alumina is preferably a γ-alumina, such as a commercial alumina from SASOL (SASOL N1, BET surface area: 150 m2/g).

We have found that at the hydrogen concentrations used in the process, the silver loading exerts an effect on NO conversion. More specifically, we have found that with a silver loading of 1 wt % both high $NO_x$ conversion and high $NH_3$ conversion are obtained over a broad range of temperatures. $NO_x$ conversions of about 95% are obtained in the temperature range of 150 to 400° C., while the $NH_3$ slip is kept low as $NH_3$ conversion is about 95% over the whole temperature range 150 to 550° C. In contrast herewith, higher silver loadings such as 2 and 5 wt % on the catalyst result in both low conversion and high ammonia slip. For instance, at 175° C. the NOx conversion with 2 and 5 wt % is about 80% and 70%, respectively, and then decreases sharply as temperatures increase. Probably, the high NO and $NH_3$ conversion with the 1 wt % silver loading stems from a low oxidation activity of finely dispersed Ag species, while a higher Ag-loading may induce a minor agglomeration of the Ag species. This second catalyst having 1 wt % silver is virtually inactive in ammonia oxidation, whereas with higher silver content, for instance 5 wt % silver, significant ammonia oxidation takes place and results in the formation of NO.

In another embodiment of the invention, in combination with one or more of the above or below embodiments, the alumina is a boehmite. We have found that when the silver is loaded on this specific type of alumina, preferably by incipient-wetness impregnation, the $NO_x$ and $NH_3$ conversion is increased, particularly when the amount of silver in this second catalyst is above 1 wt %, particularly when the amount of silver in the second catalyst is 2 to 5 wt %, more specifically 2, 3 and 5 wt %. For instance, where the second silver on alumina catalyst contains 2 wt % Ag and the alumina is boehmite, the $NO_x$ conversion at 300° C. is increased from about 60% when using 2 wt % Ag on commercial alumina (γ-alumina, SASOL N1, BET area 150 m2/g) to about 80% when using boehmite. Probably, Ag species interact stronger with this alumina surface, thereby diminishing their agglomeration while undesirable hydrogen and ammonia oxidation is suppressed.

In yet another embodiment of the invention, in combination with one or more of the above or below embodiments, the process further comprises providing at least one layer of inert material in between the first and second catalyst bed. The inert layer material is preferably quartz ($SiO_2$) which is provided as a thin layer, such as a 5 mm quartz layer. The sandwiching of a layer of inert material in between the Fe-beta-zeolite and silver on alumina catalyst beds enable a complete separation of these active beds. In other words, the mixing of Fe-beta-zeolite catalyst with the silver on alumina catalyst is avoided, especially at the interface of the catalyst beds which may cause undesirable local drop in catalytic activity for $NO_x$ reduction.

Ammonia can be supplied in the form of ammonia or a urea solution. When ammonia is supplied in pure form, it can be stored as liquid ammonia in a pressurized tank or in solid form as a metal amine salt where the ammonia is liberated from the salt by e.g. heating or other means as for instance described in WO-A-07000170. Hence, according to one further embodiment of the invention, in combination with one or more of the above or below embodiments, the ammonia is supplied from an ammonia storage media in the form of a solid metal amine out of which ammonia is liberated and the hydrogen is supplied by decomposing ammonia in an ammonia decomposition reactor. In such a set-up the required flows of ammonia and hydrogen can be achieved by separately controlling two flows of ammonia; one flow directly to the exhaust gas and the other going via the ammonia decomposition reactor to the exhaust gas—as shown in the setup displayed in FIG. 1.

Figure 2:
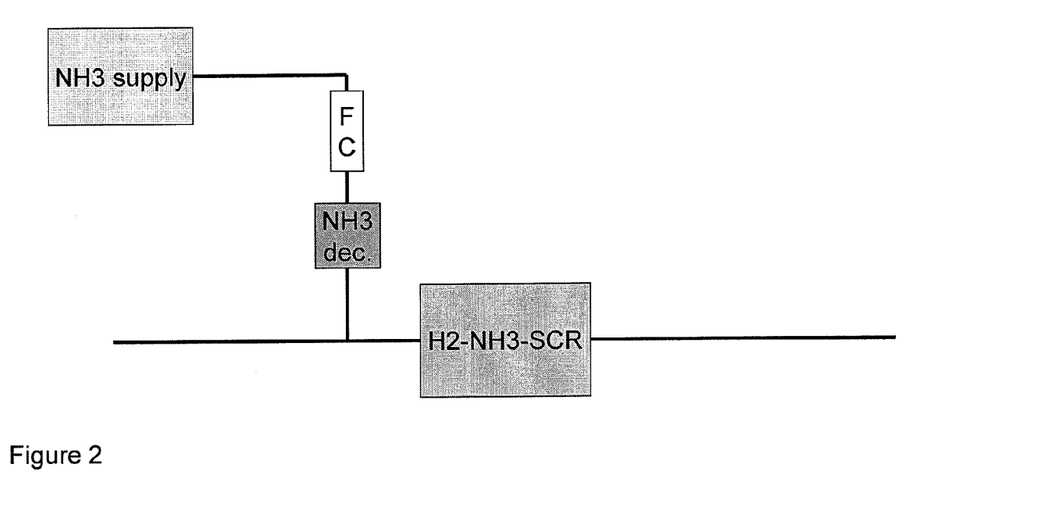
FIG. 2 shows a setup in which one flow of ammonia is controlled and the ammonia hydrogen ratio is varied by controlling the temperature in the ammonia decomposition reactor.

Alternatively, only one flow of ammonia is controlled and the ammonia hydrogen ratio is varied by controlling the temperature in the ammonia decomposition reactor as shown in FIG. 2. The latter requires an ammonia decomposition reactor where the temperature can be changed sufficiently rapid to follow the fast changes in operating conditions experienced in automotive applications; hence it has to be some kind of micro-reactor with low thermal mass. Some or all of the hydrogen can be supplied through engine management if convenient. The ammonia decomposition reactor is preferentially loaded with an ammonia decomposition catalyst. Such a catalyst can be based on an active metal like Fe, Co, Ni, Ru or combinations thereof. However, any material that can catalyse the ammonia decomposition reaction is applicable.

The hydrogen may be supplied from a hydrogen storage tank or by reforming some of the fuel used in the combustion process, e.g. diesel.

In yet another embodiment, in combination with one or more of the above or below embodiments, the process further comprises an ammonia oxidation catalyst bed downstream the second catalyst bed, preferably a catalyst comprising platinum. Such a catalyst converts by oxidation ammonia slip from the SCR and enables also the $H_2$-SCR reaction to occur at very low temperature with high $NO_x$ conversion down to 150° C. or even below.

Figure 3:
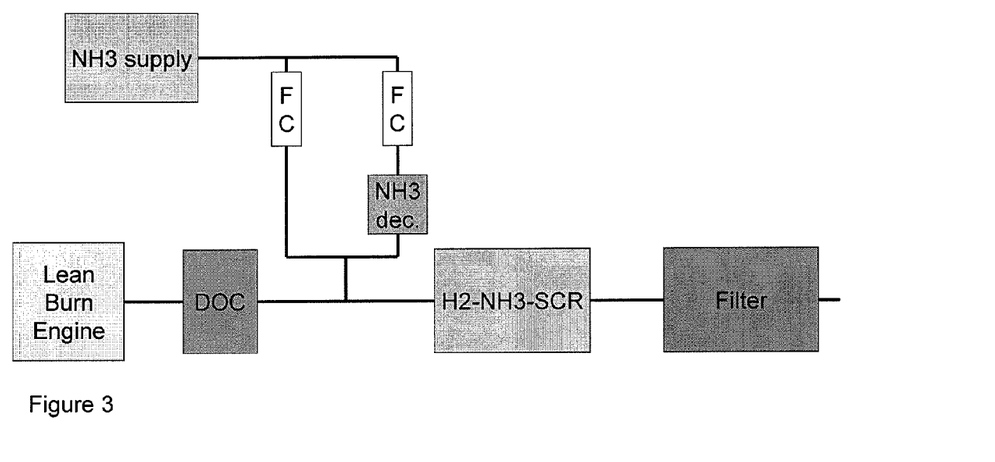
FIG. 3 shows a system in which the catalysts are coated separately on the particulate filter in order to integrate the filter and SCR functionality in the system.
Figure 4:
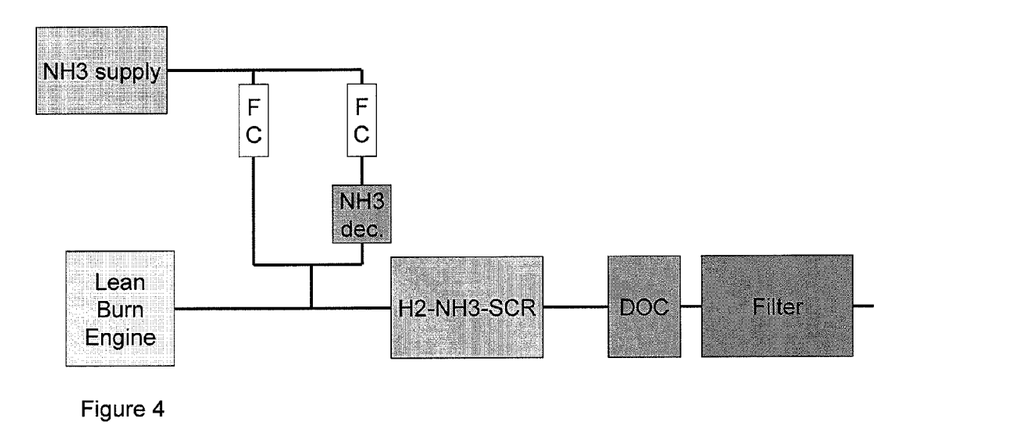
FIGS. 4 and 5 show systems in which the various elements are placed in different ways.
Figure 5:
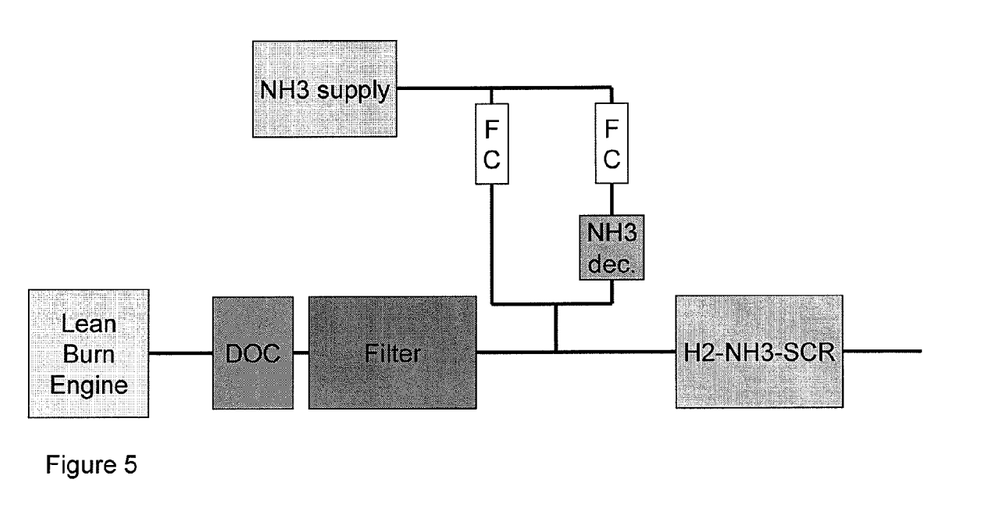

In order to have an exhaust treatment system in automotive applications that fulfils all emission requirements, the SCR catalyst often sits in an exhaust system with other elements that reduces CO, HC and particulate emissions to an acceptable level. An oxidation catalyst converts CO and hydrocarbons by oxidation to form $CO_2$ and $H_2O$. Particulate matter (mostly soot) is trapped in a particulate filter that potentially can be catalyzed to aid regeneration. As illustrated in FIGS. 3 to 5 these elements can be placed in different ways. The most optimum configuration depends on the specific engine and application. Table 1 show the advantages, disadvantages and opportunities offered by the different systems.

Regeneration of the filter (removing soot by oxidation) is also a relevant aspect of designing the most optimum system. Regeneration can to some degree be achieved by passive means during normal operation. This relies most frequently on that the filter is coated with a soot oxidation catalyst and/or on the relative higher activity of $NO_2$ in soot oxidation compared to $O_2$. Soot oxidation by $NO_2$ starts already at 200° C. Both methods are applicable in the systems shown in FIGS. 3 to 5. In systems where the filter is placed after the SCR catalyst $NO_2$ cannot be used as soot oxidant unless the $NH_3$ flow is turned off occasionally, which can be done potentially.

If passive regeneration is not sufficient to keep the filter clean, active regeneration is required from time to time. This is achieved by heating up the filter to a temperature, where the trapped soot is combusted in the oxygen rich atmosphere. Typically a temperature of 650° C. in a 10 min period is required for a full regeneration, where all soot in the filter is oxidized. In diesel applications such a high exhaust temperature is most frequently achieved by post injecting diesel in the engine in combination with a diesel oxidation catalyst in the exhaust system to burn relative high concentrations of unburned diesel under such engine operation. However, other means like electrical heating of the filter and applying a separate fuel burner in front of the filter are also an option.

TABLE 1

| System | FIG. 3 DOC-SCR-DPF | FIG. 4 SCR-DOC-DPF | FIG. 5 DOC-FILTER-SCR |
|---|---|---|---|
| Advantages | 1) the SCR catalyst is not exposed to HC which can deactivate some SCR catalysts at low temperature due to adsorption of the HC on the SCR catalyst 2) the SCR catalyst can be positioned close to the engine allowing high NOx conversions at an early stage in cold start driving cycles and therefore allowing to tune the engine to low fuel consumption, and CO, HC and soot emission. | 1) the SCR catalyst can be positioned close to the engine allowing high NOx conversions at an early stage in cold start driving cycles and therefore allowing to tune the engine to low fuel consumption, and CO, HC and soot emission. | 1) the SCR catalyst is not exposed to HC or particulates which can deactivate some SCR catalysts at low temperature due to adsorption the HC on the SCR catalyst 2) $NO_2$ can be used for passive regeneration of the filter |
| Disadvantages | 1) $NO_2$ does not reach the filter and passive filter regeneration via soot oxidation by $NO_2$ is not possible. 2) If active filter regeneration (heating the filter to typically 650° C.) is performed by injection of extra diesel upstream the DOC and the SCR catalyst also has to be heated up. | 1) $NO_2$ does not reach the filter and passive filter regeneration via soot oxidation by $NO_2$ is not possible. 2) the SCR catalyst is exposed to HC which can deactivate some SCR catalyst at low temperature due to adsorption of the HC. | 1) the SCR catalyst cannot sit close to the engine, and high levels of NOx removal is difficult to achieve in cold start driving cycles. |
| Potential opportunities | Active filter regeneration can potentially be achieved by the $NO_2$ mechanism if the $NH_3$ dosage is shut off at the most appropriate conditions. For some SCR catalysts $H_2$ can aid the oxidation of NO to $NO_2$ at low temperature. | Active filter regeneration can potentially be achieved by the $NO_2$ mechanism if the $NH_3$ dosage is shut off at the most appropriate conditions. For some SCR catalysts $H_2$ can aid the oxidation of NO to $NO_2$ at low temperature. | |

The active catalyst components are for most applications coated on a monolith substrate. Preferably, in combination with one or more of the above or below embodiments, the iron-beta-zeolite and silver on alumina catalysts are coated at each end of a monolith substrate in order to obtain not only the necessary physical separation of Fe-beta-zeolite and downstream $Ag/Al_2O_3$, but also a common mechanically stable, catalytic element with low pressure drop in the exhaust system. The monolith substrate can be based on extruded cordierite or corrugated structures of metal or fibber materials.

The catalysts may also be coated separately on the particulate filter in order to integrate the filter and SCR functionality in the system displayed in FIG. 3.

In a second aspect of the invention, we provide the catalyst system used in the process. Accordingly, as set forth in claim 11 we provide also a catalyst system for reduction of nitrogen oxides from exhaust gases comprising at least two catalyst beds, in which a first catalyst bed is iron-beta-zeolite and a second catalyst bed downstream is silver supported on alumina.

In another embodiment, the catalyst system may further comprise at least one inert layer of material in between the first and second catalyst bed as set forth in claim 12. This enables, as explained above, a complete separation of the iron-beta-zeolite and the silver on alumina, thereby reducing potential local drops in performance, particularly at the contact interface of both catalysts.

The catalyst system according to claim 11 or 12 may further comprise an ammonia oxidation catalyst bed downstream the second catalyst bed in order to not only remove any remaining ammonia in the gas, but also to promote high performance (high NO conversion) at very low temperatures, i.e. temperatures below 150° C., such as 100° C.

The catalyst system of claims 11 to 13 is used in the presence of a reducing agent, preferably a reducing agent selected from ammonia, urea, hydrogen, alkanes, alkenes and mixtures thereof, more preferably a mixture of hydrogen and ammonia, most preferably a mixture of hydrogen and ammonia supplied in equimolar concentrations.

As set forth in claim 14 the invention encompasses also the us of the catalyst system of claims 11 to 13 for the treatment of exhaust gases from lean combustion engines, gas turbines and boilers.

Figure 1:
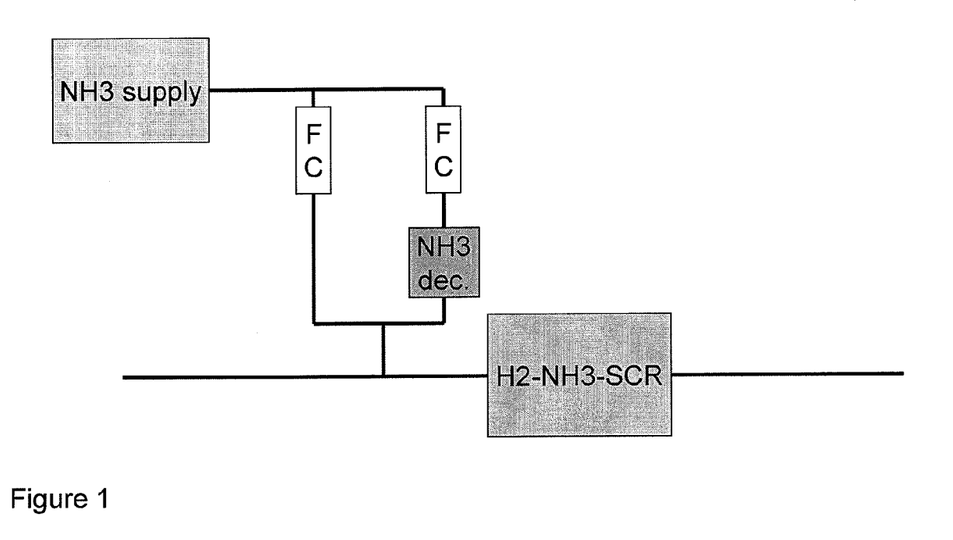
FIG. 1 shows a system set-up in which the required flows of ammonia and hydrogen can be achieved by separately controlling two flows of ammonia; one flow directly to the exhaust gas and the other going via the ammonia decomposition reactor to the exhaust gas.

Referring now to the accompanying Figures, FIG. 1 shows a general embodiment of the process of the invention in which ammonia and hydrogen are provided in separate lines before combining the streams and contacting with the SCR catalyst system in the exhaust gas.

FIG. 2 shows an embodiment of the process of the invention in which ammonia and hydrogen are provided through a single line where hydrogen is produced via passage through an ammonia decomposition reactor before contacting with the SCR catalyst system in the exhaust gas.

FIGS. 3 to 5 show more specific embodiments of the general embodiment of FIG. 1, including different locations of the oxidation catalyst and particulate filter with respect to the SCR catalyst system in the exhaust gas.

Figure 6:
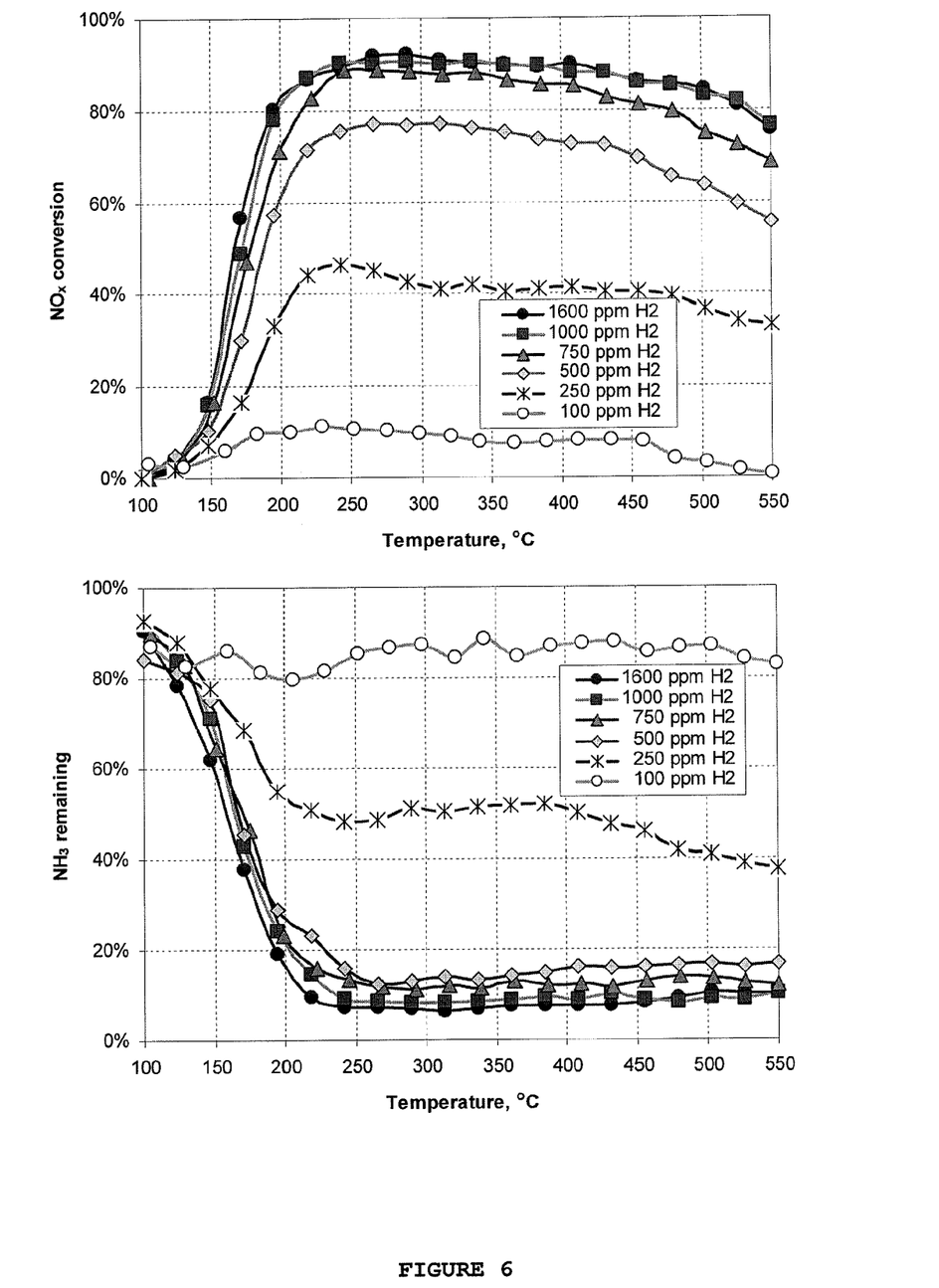
FIG. 6 shows the influence of $H_2$ concentration on the performance of 1 wt % Ag/alumina in $NH_3$ SCR.

FIG. 6 shows the influence of $H_2$ concentration on the performance of 1 wt % Ag/alumina in $NH_3$ SCR. The top part shows NOx conversion and the bottom part the percentage of $NH_3$ remaining.

Figure 7:
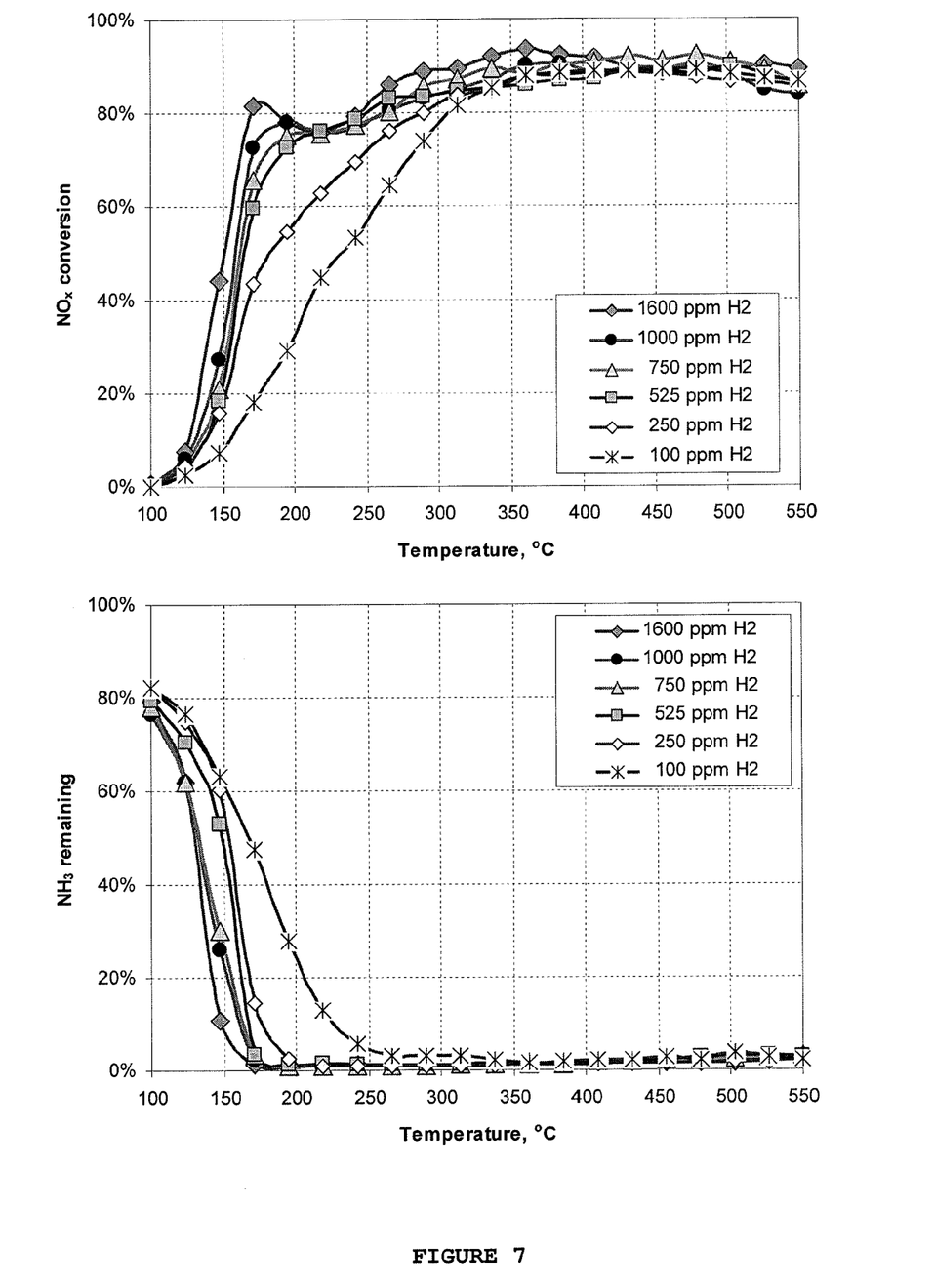
FIG. 7 shows the influence of $H_2$ inlet concentration on the performance of a catalyst according to the invention consisting of layered iron-beta-zeolite and 1 wt % Ag/alumina in $NH_3$ SCR.

FIG. 7 shows the influence of $H_2$ inlet concentration on the performance of a catalyst according to the invention consisting of layered iron-beta-zeolite and 1 wt % Ag/alumina in $NH_3$ SCR. The top part shows $NO_x$ conversion and the bottom part the percentage of $NH_3$ remaining.

Figure 8:
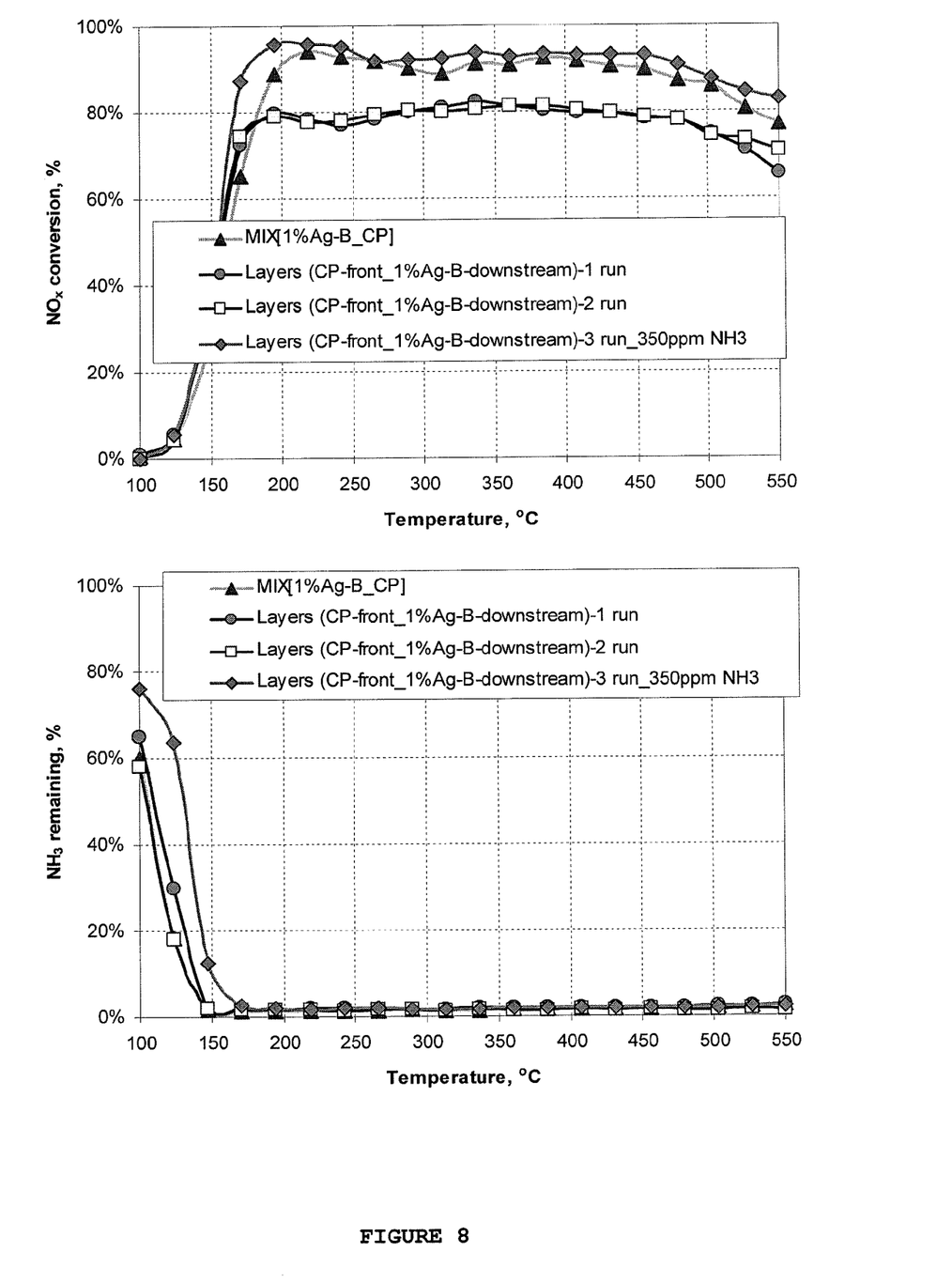
FIG. 8 shows a comparative study on the deactivation of simply mechanically mixing iron-beta-zeolite and silver on alumina vs a dual bed catalyst of iron-beta-zeolite and silver on alumina.

FIG. 8 shows a comparative study on the deactivation of simply mechanically mixing iron-beta-zeolite and silver on alumina vs a dual bed catalyst of iron-beta-zeolite and silver on alumina. The top part shows $NO_x$ conversion and the bottom part the percentage of $NH_3$ remaining.

Example 1

Comparative

Experiments were conducted to evaluate the performance of 1% Ag—$Al_2O_3$ (1 wt %) in $NH_3$-$DeNO_x$ upon changing $H_2$ concentration from 100 to 1600 ppm. These experiments allow evaluation of the efficiency of overall $NH_3$-$DeNO_x$ process with $H_2$-coffeding in terms of the amount of $H_2$ required for high $NO_x$ conversion.

The catalyst containing 1 wt % $Ag/Al_2O_3$ (SASOL 1, $S_{BET}$=150 m$^2$/g) was prepared by incipient-wetness impregnation, where 3.0 g $Al_2O_3$ (SASOL N1) was loaded with 1 wt % Ag by incipient-wetness impregnation with a water solution of $AgNO_3$ (2.2 ml) containing 0.014 g Ag/ml. The product was dried overnight at room temperature in air. The resulting material was calcined at 600° C. (4 h) in flowing air (~300 ml/min). The temperature was increased from room temperature to 600° C. at a rate of 0.5° C./min.

The performance of 1% Ag—$Al_2O_3$ in $NH_3$-$DeNO_x$ at different $H_2$ concentrations is shown in FIG. 6, top part. Reaction conditions: GHSV=72 000 h$^{-1}$, feed gas composition: 345 ppm $NH_3$, 300 ppm NO, 100 to 1600 ppm $H_2$, 7% $O_2$, 4.5% $H_2O$, 10% $CO_2$ balance with $N_2$. Overall flow rate: 500 ml/min. Catalyst load: 0.36 g 1% $Ag/Al_2O_3$ (Sasol#1).

The $NO_x$ conversion increases rapidly with increasing $H_2$ content from 100 to 750 ppm, and the further increase of $H_2$ content to 1000 and 1600 ppm does not notably improves $NO_x$ conversion. Analysis of the dependency of the amount of $NH_3$ remaining in the exhaust gas also indicates that the increase in $H_2$ content from 100 to 750 ppm results in the rapid decrease in $NH_3$ slip, while a further increase in $H_2$ content does not essentially change this parameter.

Noteworthy is the variation of $NO_x$ conversion with the reaction temperature when hydrogen content is below optimum (e.g. at 500 to 250 ppm). $NO_x$ conversion remains essentially constant at 250 to 450° C. and decreases slightly with a further increase in the reaction temperature. This indicates that the reaction rate does not virtually change with the reaction temperature within a wide temperature range. A similar tendency can be revealed by analysis of the amount of $NH_3$ remaining in the exhaust gas (FIG. 6, bottom part).

These data imply that the reaction rate is essentially independent of the reaction temperature within a wide temperature range. It is conceivable that hydrogen participates in certain steps of the overall reaction mechanism, and there is a stoichiometric relation between the amount of hydrogen fed to the catalyst and the amount of $NO_x$ converted. Thus, $NO_x$ conversion over $Ag/Al_2O_3$ in $NH_3$-$DeNO_x$ seems to be very sensitive with respect to hydrogen content. Reduction of 1 NO molecule requires at least 1.5 to 2 hydrogen molecules.

Example 2

Invention

The performance of layered Fe-beta-zeolite (commercial CP7124) and 1% Ag—$Al_2O_3$ (1 wt %) in $NH_3$-$DeNO_x$ at different $H_2$ concentrations was investigated. The amount of $H_2$ added into the reaction mixture was changed from 100 ppm to 1600 ppm and the catalyst performance was evaluated at 100-550° C. Reaction conditions: Feed gas composition: 340 ppm $NH_3$, 300 ppm NO, 100-1600 ppm $H_2$, 7% $O_2$, 4.5% $H_2O$, 10% $CO_2$ balance with $N_2$. Overall flow rate: 500 ml/min. Catalyst load: 0.12 g Fe-beta-zeolite (front layer)+ 0.36 g 1% $Ag/Al_2O_3$ (downstream layer).

The layered catalyst consisted of a 0.12 g top layer (0.2 $cm^3$) of Fe-beta-zeolite, fraction 0.4 to 1.0 mm and a 0.36 g bottom layer (0.5 $cm^3$) of 1 wt % $Ag/Al_2O_3$ (SASOL 1).

The layered catalyst was prepared by incipient-wetness impregnation where 5.0 g $Al_2O_3$ (SASOL N1) was loaded with 1 wt % Ag by incipient-wetness impregnation with a water solution of $AgNO_3$ (3.7 ml) containing 0.014 g Ag/ml. The product was dried overnight at room temperature in air. The resulting material was calcined at 550° C. (4 h) in flowing air (~300 ml/min). The temperature was increased from room temperature to 550° C. at a rate of 0.5° C./min.

Top layer: 0.12 g (0.2 $cm^3$) of CP 7124 (Fe-Beta), fraction 0.4 to 1.0 mm.

Bottom layer: 0.36 g (0.5 $cm^3$) of 1 wt % $Ag/Al_2O_3$ (SASOL 1)—100 prepared as described above, fraction 0.4 to 1.0 mm.

Performances of the layered (dual bed) Fe-beta-zeolite and 1% Ag—$Al_2O_3$ in different $H_2$ concentrations are compared in FIG. 7, top part. Increase in $H_2$ concentration from 100 to 525 ppm results in a rapid improvement of the catalyst performance at 150 to 300° C. temperature range. A further increase of the $H_2$ concentration to 750, 1000 and 1600 ppm, respectively, results in a minor improvement of the catalyst performance which is particularly evident at 120 to 170° C. The most pronounced improvement in the catalyst performance is observed upon increasing $H_2$ content to 500 to 600 ppm.

According to Example 1, we found with the $Ag/Al_2O_3$ catalyst that the reduction of 1 mole of NO requires 1.5 to 2 moles of $H_2$. Taking into account that the inlet NO concentration is about 300 ppm and a part of it is reduced over front Fe-beta-zeolite, 500 ppm $H_2$ might be sufficient for the effective reduction of the residual $NO_x$.

The layered Fe-beta-zeolite/1% Ag—$Al_2O_3$ catalyst demonstrates a similar dependency of the performance on $H_2$ content as compared to Ag—$Al_2O_3$ catalyst (Example 1). On the other hand, the presence of Fe-beta-zeolite catalyst provides a good catalytic activity at 250 to 550° C. even at an $H_2$ content as low as 100 ppm. Within 150 to 250° ' a significant improvement of the catalyst performance can be achieved by an increase of the $H_2$ concentration to 525 ppm, while a further increase to 750 to 1600 ppm results in a minor improvement of $NO_x$ conversion. These data show that the layered catalyst system is more effective in terms of $H_2$ consumption as compared to Ag—$Al_2O_3$ due to the performance synergy between Ag—$Al_2O_3$ and Fe-beta-zeolite components. More specifically, the hydrogen consumption is reduced compared to a situation where only silver supported on alumina is used. Good SCR catalytic activity (about 60% NOx conversion already at 250° C.) is found in the broad temperature range 250 to 550° C. even in a gas with approximately 1:0.3:1 molar ratio of $NH_3$:$H_2$:NO, i.e. reduction of 1 mole of NO requires less than 1 mole of hydrogen.

Example 3

The performance of simply mechanically mixing Fe-beta-zeolite with $Ag/Al_2O_3$ was compared with the dual bed Fe-beta-zeolite with $Ag/Al_2O_3$, in which there is spatial separation of both catalysts, with Fe-beta-zeolite as a front part of the catalyst.

Mechanically mixed catalyst system: 0.31 g (0.5 $cm^3$) of 1 wt % $Ag/Al_2O_3$ (Boehmite)—prepared as described below—was mixed with 0.12 g (0.2 $cm^3$) of Fe-beta-zeolite (CP 7124), thoroughly crushed to powder and pressed fraction of 0.4 to 1.0 mm. The 1 wt % $Ag/Al_2O_3$ (Boehmite) was prepared by incipient-wetness impregnation where 3.0 g of Boehmite was loaded with 1 wt % Ag by incipient-wetness impregnation with a water solution of $AgNO_3$ (2.2 ml), containing 0.014 g Ag/ml. The product was dried overnight at room temperature in air and the resulting material was calcined at 600° C. (4 h) in flowing air (~300 ml/min). The temperature was increased from room temperature to 600° C. at a rate of 0.5° C./min. The resulting catalyst composition of the mix was 1 wt % $Ag/Al_2O_3$ (Boehmite) (0.31 g)+Fe-beta-zeolite (0.12 g).

Layered (dual bed) catalyst: a catalyst system of layered Fe-beta-zeolite+1 wt % $Ag/Al_2O_3$ (Boehmite) was prepared. The top layer consisted of 0.12 g (0.2 $cm^3$) of Fe-beta-zeolite (CP 7124), fraction of 0.4 to 1.0 mm. The bottom layer consisted of 0.31 g (0.5 $cm^3$) of 1 wt % $Ag/Al_2O_3$ (Boehmite) (prepared as described above), fraction of 0.4 to 1.0 mm. The resulting catalyst composition of the layered catalyst was Fe-beta-zeolite (0.12 g) 1 wt % $Ag/Al_2O_3$ (Boehmite) (0.31 g.

The data obtained reveal a strong deactivation of the mixed catalyst, presumably upon heating of the catalyst after cooling down in the reaction mixture. In FIG. 8, the stability of the mixed and layered catalyst systems is compared upon repetitive catalytic runs.

There is no deactivation of the layered catalyst (in circles and squares) in the course of the second and following catalytic run. The stability of the layered catalyst appears to be significantly higher as compared to the mixed catalyst (in triangles) for which the performance after 1 run is shown.

Incomplete $NO_x$ conversion (FIG. 8, top part) was found to be a result of a decreased concentration of ammonia in the feed gas. After increasing the ammonia content to 340 to 350 ppm, the $NO_x$ conversion over layered catalyst after 3 runs (in diamonds) is essentially identical to that observed over freshly prepared mixed catalyst after 1 run (in triangles). The Figure shows that the performance of layered Fe-beta-zeolite+Ag—$Al_2O_3$ catalyst comprising separated layers of Fe-beta-zeolite (front) and Ag—$Al_2O_3$ (downstream) was found to be superior to the performance of mixed Ag—$Al_2O_3$+Fe-beta-zeolite. The catalyst demonstrates a stable performance and no tendency toward deactivation after repetitive catalytic cycles.

What is claimed is:

1. Process for reducing nitrogen oxides to nitrogen in an exhaust gas comprising passing the exhaust gas in the presence of a reducing agent through a catalyst system comprising at least two catalyst beds, in which a first catalyst bed is an iron-beta-zeolite and a second catalyst bed downstream is silver supported on alumina.

2. Process according to claim 1, wherein the reducing agent is selected from ammonia, urea, hydrogen, alkanes, alkenes and mixtures thereof.

3. Process according to claim 2, wherein the reducing agent is a mixture of hydrogen and ammonia.

4. Process according to claim 1, wherein the amount of silver in the second catalyst bed is 0.5 to 5 wt %.

5. Process according to claim 4, wherein the amount of silver is 1 wt %.

6. Process according to claim 4, wherein the alumina is a boehmite.

7. Process according to claim 1, further comprising providing at least one inert layer of material in between the first and second catalyst bed.

8. Process according to claim 1, wherein the ammonia is supplied from an ammonia storage media in the form of a solid metal amine out of which ammonia is liberated and the hydrogen is supplied by decomposing ammonia in an ammonia decomposition reactor.

9. Process according to claim 1, further comprising an ammonia oxidation catalyst bed downstream the second catalyst bed.

10. Process according to claim 1, wherein the iron-beta-zeolite and silver on alumina catalysts are coated at each end of a monolith substrate.

11. Catalyst system for reduction of nitrogen oxides from exhaust gases comprising at least two catalyst beds, in which a first catalyst bed is iron-beta-zeolite and a second catalyst bed downstream is silver supported on alumina.

12. Catalyst system according to claim 11, further comprising at least one inert layer of material in between the first and second catalyst bed.

13. Catalyst system according to claim 11, further comprising an ammonia oxidation catalyst bed downstream the second catalyst bed.

14. A method of treating exhaust gases from lean combustion engines, gas turbines and boilers, comprising the step of utilizing the catalyst system of claim 11 for the treatment of exhaust gases from lean combustion engines, gas turbines and boilers.

* * * * *